Figure 1:
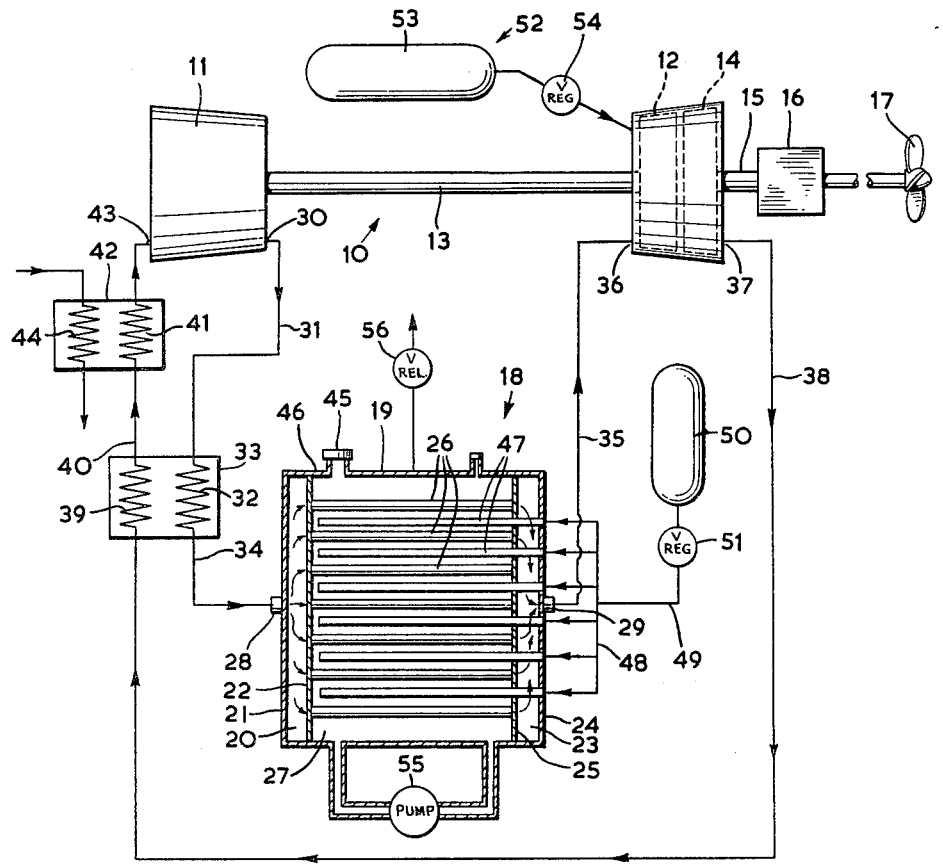

Dec. 21, 1965  G. C. BEST  3,224,199
CLOSED CYCLE GAS TURBINE
Filed Oct. 19, 1964  2 Sheets-Sheet 1

INVENTOR
GEORGE COLVILLE BEST

BY~ *Maybee & Legris*

ATTORNEYS

INVENTOR
GEORGE COLVILLE BEST
BY Maybee & Legris
ATTORNEYS

United States Patent Office 3,224,199
Patented Dec. 21, 1965

3,224,199
CLOSED CYCLE GAS TURBINE
George Colville Best, Clarkson, Ontario, Canada, assignor to Hawker Siddeley Canada Ltd., Toronto, Ontario, Canada, a corporation of Canada
Filed Oct. 19, 1964, Ser. No. 404,704
14 Claims. (Cl. 60—59)

This invention relates to gas turbine engines and more particularly to closed cycle gas turbine power plants applicable to torpedoes.

At present, closed cycle gas turbine power plants differ widely as to the way in which heat is introduced into the working medium. For example, heat can be generated by the combustion of fuel in the ambient air, and then transferred to the working medium by conduction in a suitable heat exchanger. Another known method of adding heat to the working medium is by burning a fuel, such as an alkali metal, with a suitable oxidant in the direct presence of the working medium in the closed circuit. This method, however, necessitates the subseqent removal of undesirable reaction products from the working medium before the working medium is expanded through the turbine. It is also known to use an atomic reactor as a source of heat in conjunction with a closed cycle gas turbine.

It has been proposed to use closed cycle gas turbines for the propulsion of torpedoes, although in the past a more common source of power for torpedoes has been a system in which fuel from a fuel container is mixed with hydrogen peroxide or air from a compressed air tank and burned in a generator in the presence of water, the resultant steam and products of combustion first passing to an engine which powers the torpedo propellers and then being expelled from the torpedo. The latter method of torpedo propulsion has three particular disadvantages which this invention aims at overcoming: first, the emission of the gaseous exhaust causes bubbling which produces underwater noise that can be detected by underwater audio devices; secondly, the exhaust causes a surface wake which is visible under moderate weather and sea conditions, including darkness; and thirdly, power declines as depth increases. In the past, attempts to apply closed cycle gas turbines to torpedoes have not eliminated the necessity for exhausting certain gaseous products from the torpedo, and thus torpedoes have not been freed of the disadvantages listed above.

It is an object of this invention to provide a gas turbine power plant from which no exhaust products are emitted, and which is therefore suitable for use as a power source for a torpedo.

It is a further object of this invention to provide for a gas turbine a heat source which is rechargeable or replaceable as a unit.

Figure 2:
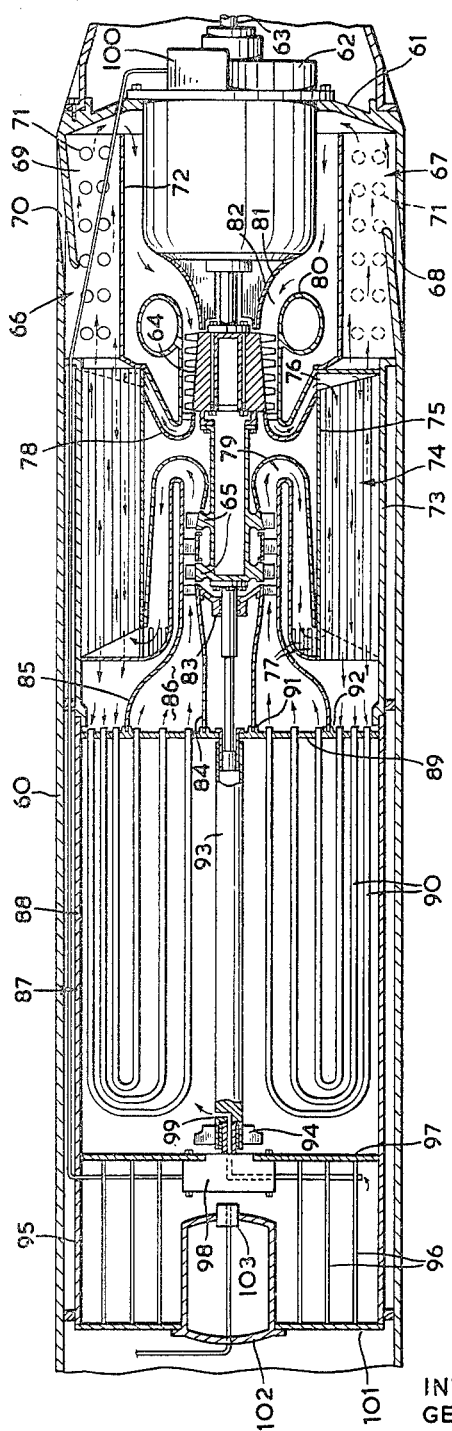

Other objects and advantages will become apparent to one skilled in the art from the following description taken in conjunction with the accompanying drawings wherein like reference characters refer to like parts throughout and in which:

FIG. 1 is a diagrammatic representation of a power plant constructed in accordance with the invention; and FIG. 2 is an axial sectional view of one arrangement of a complete propulsion system contained within a tubular torpedo body shell.

In FIG. 1, a free-shaft gas turbine power unit is generally indicated at 10, and includes a rotor system having a compressor 11 and a turbine 12 drivingly coupled together by a shaft 13. A free power turbine 14, in tandem with the turbine 12, is drivingly coupled by a shaft 15 through a reduction gear box 16 to a marine screw propeller 17. The members described thus far are the conventional members of a cyclical power plant in which the compressor supplies a compressed working medium to be expanded and cooled through the turbine to produce useful work, the expanded, cooled working medium being then recirculated back to the compressor to recommence the cycle. Although a free-shaft gas turbine is shown, other kinds such as a direct-coupled shaft type are also contemplated within the scope of this invention.

Standard closed cycle gas turbine engines include, at a point in the path of the working medium between the compressor and the turbine, a hydrocarbon fuel combustion system and a heat exchanger structure by which heat may be generated and transferred to the working medium before it enters the turbine. In the present invention, the place of this element is taken by a reactor, generally indicated at 18. The reactor 18 includes a container 19, which is generally cylindrical in shape but which may take other forms according to system installation requirements. Preferably, the container 19 is constructed from a material such as high chrome content stainless steel and nickel, chromium and cobalt alloys. An end space 20 is defined at one end of the container 19 between an end wall 21 and a bulkhead 22, and an end space 23 is defined at the other end of the container 19 between an end wall 24 and a bulkhead 25. The end spaces 20 and 23 communicate with each other through a plurality of tubes 26, having their ends set in the bulkheads 22 and 25. The container 19 can thus be considered a two-compartment heat exchanger, the end spaces 20 and 23 and the tubes 26 constituting one of the compartments, and the chamber 27 intersticially of the tubes and between the two bulkheads 22 and 25 constituting the other compartment. The two compartments of the heat exchanger are thus sealed off the one from the other.

Releasable pipe couplings 28 and 29 are set in the end walls 21 and 24, respectively, and thus communicate with the corresponding end spaces 20 and 33.

The working medium compressed by the compressor 11 leaves the compressor 11 at an outlet 30, travels along a duct 31, passes through one side 32 of a recuperator 33, and enters the duct 34, from which it passes through the outlet coupling 28 and into the end space 20 of the container 19. From the end space 20, the working medium passes through the tubes 26 and into the end space 23, from whence it enters a duct 35 by way of the outlet coupling 29, and finally enters the turbine 12 at an inlet 36. The working medium passes through both turbines 12 and 14, expanding, cooling and doing work, and passes out through outlet 37 and into a duct 38. The duct 38 leads the working medium into the other side 39 of the recuperator 33, from whence the working medium passes into a duct 40, through one side 41 of a precooler 42, and finally returns through the inlet 43 to the compressor 11 to recommence its cycle. The recuperator 33 is a conventional gas-to-gas heat exchanger, and in it, heat is transferred from the working medium before compression to the working medium after compression. The precooler 42 is a conventional gas-to-liquid type, there being provision for coolant (sea-water in the case of a torpedo) to pass in the direction indicated by the arrow-head through the other side 44 of the precooler 42. In the precooler 42 further waste heat is removed from the working medium before compression but downstream of the heat recuperator 33. Both the recuperator 33 and the precooler 42 are conventional in general design, but will be adapted to their particular environmental and operational requirements.

Returning now to the container 19, it is in the chamber 27 that heat is generated by an exothermic chemical reaction, the heat being transferred to the working medium through the walls of the tubes 26 as the working medium passes through the latter.

The numeral 45 indicates a filler port and closure set in the upper side wall 46 of the container 19 and communicating with the chamber 27 between the bulkheads 22 and 25.

The chamber 27 contains a liquid alkali metal, preferably the eutectic alloy of sodium and potassium which is a 77.2% potassium alloy that is a liquid at room temperatures. It is contemplated that the chamber 27 be almost completely filled with the liquid metal alloy, and that a helium or other inert gas atmosphere be introduced thereover.

A plurality of probes 47 extend through the end wall 24 and the bulkhead 25 into the interstices between the tubes 26, that is, into the chamber 27. The probes 26 are preferably constructed of a porous ceramic material or of a suitable sintered metal, and they extend from a manifold 48 into which opens a conduit 49. A gas bottle 50 contains a gaseous halogen under pressure, preferably chlorine trifluoride, and is connected through a control valve 51 to the conduit 49.

The working medium may be dry ambient air or an inert gas such as helium or argon. The numeral 52 indicates generally a starting system suitable for torpedo installation. A cylinder 53 contains compressed working medium and can deliver the working medium under pressure through a regulator 54 to a series of nozzles (not shown) which are tangentially disposed to the blades of the turbine 12 such that jets of the working medium emitting therefrom will impinge upon the blades of the turbine 12 so as to spin it up. Because the working medium travels in a closed circuit, whatever amount of working medium is used to start the turbine 12 spinning will be added to the total amount of the working medium already in the closed circuit. Consequently, since the denser is the working medium the greater is the power output, control of the amount of working medium used to start the turbine 12 will control the power output of the turbine. Other methods of starting the system which are convenient to the installation of the power plant may also be used.

The original contents of the chamber 27 will hereinafter be referred to as the reactant, and the contents of the gas bottle 50 as the oxidant. To promote more efficient mixing and reaction between the oxidant and the reactant, an electro-dynamic pump 55 is fitted to the container 19 in such a way as to circulate the reactant through the chamber 27. The pump 55 may derive its power from any convenient point in the rotor system.

Operation

To start the power plant, the control valve 51 is opened to allow the chlorine trifluoride to pass through the conduit 49 to the probes 47. The chlorine trifluoride will permeate the porous material of the probes 47 and diffuse out into the sodium-potassium alloy in the chamber 27. The pores in the material of which the probes 47 are constructed are of a size which will permit passage of the gas outwardly but will not permit passage of the liquid alkali inwardly to the conduit 49.

With the reactant and oxidant in contact, an exothermal chemical reaction will commence. The heat of formation given off by the reaction is transferred to the working medium through the walls of the tubes 26. Substantially simultaneously with the start of the chemical reaction, the starting system 52 will be initiated to spin up the turbine 12 and the compressor 11. As the temperatures of the working fluid throughout the system become stabilized, the system will become self-sustaining and the power plant will continue running as long as sufficient heat of formation from the chemical reaction is available.

The following three chemical reactions are considered suitable for use with this invention, although the first listed is preferred over the remaining two:

(1) $4NaK_2 + 3ClF_3 \rightarrow NaCl + 2KCl + 3NaF + 6KF$ (2) $2NaK_2 + 3Cl_2 \rightarrow 2NaCl + 4KCl$ (3) $4Li + ClF_3 \rightarrow LiCl + 3LiF$ The last listed chemical reaction is particularly problematical because the melting point of lithium is 186° C., and consequently it could not be stored in the chamber 27 as a liquid at ordinary temperatures. The use of lithium in small pellet form could partially overcome the problems presented by the use of solid fuel, but the handling and oxidation problems would thereby be greatly increased. By using instead the preferred eutectic alloy of sodium and potassium, however, the contents of the chamber 27 will be liquid at both ordinary and operating temperatures, permitting good heat transfer and the promotion of good mixing of the reactant and oxidant. With pure reactant and pure oxidant, the volume change during the chemical reaction is so small that no discharge from the chamber 27 is necessary. Impurities such as water vapor in the chlorine or fluorine, however, may generate small quantities of gaseous products, and these can be bled off through a safety valve 56 which also acts as a release valve in case the temperature control fails and the temperature of the liquid metal rises to the boiling point. If the impurities are sufficiently reduced however, the chamber 27 can remain completely closed during the chemical reaction.

Prior to starting the power plant, pressure readings from the chlorine/fluorine bottle 50 and the starting gas bottle 53 will disclose any leakage which would reduce range or power. A pressure reading from the heat exchanger 18 will disclose most types of leakage or contamination in this area.

It is contemplated that the heat exchanger 18 which may be regarded as the power pack will be removable so that when spent it can be replaced by a freshly charged unit. The residual salts in the spent heat exchanger will then be removed and the exchanger recharged with fresh metals.

FIG. 2 shows an arrangement for a complete propulsion system.

Mounted coaxially within the body shell 60 so as to extend forwardly through a rear bulkhead 61, is a speed reducing gear box 62 (corresponding to gear box 16 in FIG. 1); an output shaft 63 from the gearbox drives the marine propeller of the torpedo (not shown). Splined to the input shaft of the gear box is the rotor shaft of a six-stage axial compressor 64, and forward of the compressor, directly and drivingly coupled thereto is a two-stage turbine 65.

Extending forwardly of the bulkhead 61, integrally formed with the torpedo body shell 60 is a precooler 66. The pre-cooler comprises a lower inlet plenum 67 having a forwardly facing flush inlet 68, and an upper outlet plenum 69 having a rearwardly facing flush outlet 70; both plenums being interconnected by a series of semi-circular water tubes the ends of which are shown at 71. The tubes are arranged within the annular space defined by the body shell 60 and an inner annular wall 72 and supported therein by close-pitch, radially disposed fins (not shown) through which they pass. The annular space of the pre-cooler is divided into two segments by the lower and upper plenums 67 and 69. The lower plenum 67 is divided to ensure a flow of cooling water up each set of tubes to the common outlet plenum 69.

Forward of the pre-cooler 66, housed in a cylindrical casing 73 which is spaced from the body shell 60 is a fully annular single-pass, counter-flow recuperator 74 (corresponding to recuperator 33 in FIG. 1). The matrix comprises a series of alternate plane and axially corrugated plates, radially disposed within the space defined by the casing 73 and an inner cylindrical wall 75. At the ends of the recuperator, alternate corrugated plates are obliquely trimmed to allow gas entry through slots 76 and 77 in the inner wall 75, while the plane plates are extended past the slots and alternate adjacent ends thereof sealed to deflect gas from the slots through the recuperator. An annular sheet metal reverse-flow duct 78 connects the outlet of the compressor 64 to the recuperator 74 through slots 76. A similar duct 79 connects the outlet of the turbine 65 with the recuperator through slots 77. An annular pressure vessel 80 containing a compressed gas that is the same as the working medium of the power plant defines, with a compressor rotor shaft support casting 81, an annular compressor inlet 82. The pressure vessel 80 may be provided with regulating valve means to supply a tangential nozzle system (not shown) adapted to spin up the rotor for starting purposes either by impingement upon the turbine or compressor blades as convenient or desired. From a forward turbine rotor bearing support casting 83 inner and outer flared annular duct walls 84 and 85 extend forwardly to define a turbine intake duct 86. The gas turbine may be supported coaxially within the recuperator 74 in any convenient manner so that the whole recuperator/power unit assembly may be withdrawn forwardly through the torpedo body shell 60 when the war head (not shown) is removed.

Forward of the power unit and spigotted to casing 73 is a reactor 87 (corresponding to reactor 18 in FIG. 1). The reactor comprises a cylindrical tank 88. Extending axially of the tank with their terminal ends set through an end wall 89 thereof is a radial arrangement of U-tubes 90. Annular pick-up rings 91 and 92 on the wall 89 are adapted to receive the rims of walls 84 and 85 of duct 86 such that all the inwardly disposed ends of the U-tubes 90 communicate with the turbine inlet duct 86 while all the outwardly disposed ends of the tubes communicate with the recuperator 74. Mounted for rotation, coaxially within the tank 88 is a shaft 93 carrying at its forward end a bladed impeller 94. Due to the violent nature of the reactant, oxidant and the chemical reaction between them, the shaft 93 is driven by the turbine through the end wall 89 by a hermetically sealed, harmonic drive, strain wave gear which requires no rotating seal. The liquid metal reactant is contained within the tank 88.

Forward of the reactor is an oxidizer tank 95. This tank too is cylindrical and may conveniently be made integral with the reactor tank 88. An arrangement of tie rods 96 gives the tank axial resistance to internal pressure. Set in an inner wall 97 which is common to both tanks is a flow conrtol valve 98 which is adapted to transfer liquid oxidizer through a distributor head 99, associated with the impeller 94, into the reactor to be diffused throughout the reactant. The control valve 98 is arranged to be responsive to a signal from a governor 100 driven off the gear box 62 and to an overriding signal from a temperature limiter (not shown) in the reactor. Mounted upon a forward end wall 101 of the oxidizer tank and extending within the tank is a pressure bottle 102 containing an inert gas such as helium. The gas is released into the oxidizer tank through a valve 103 responsive to the starting signal which initiates the flow of the working medium from the pressure vessel 80.

The operation of the power plant of FIG. 2 is essentially the same as described with reference to FIG. 1 and therefore does not require detailed description here. A starting signal initiates the release of the pressurized working medium from the pressure vessel 80 through the starting nozzle system (not shown) to spin up the gas turbine rotor. Simultaneously, the pressurized gas in the bottle 102 is released into the oxidizer tank, pressurizing the liquid oxidant therein. The oxidant flow control valve 98 responsive to the now rotating governor 100 will release the oxidant through the distributor head 99 and the reaction with the alkali metal will begin liberating heat. Prior to starting, the working medium in the turbine circuit will be at atmospheric pressure or slightly above. The starting gas entering the system will begin to flow through the circuit and for convenience we shall start at the compressor intake 82.

Passing through the compressor 64, the gas reverses flow along the annular duct 78 to make a forward pass through the recuperator. It passes on through the U-tubes 90, picking up heat from the chemical reaction within the reactor 87 and emerging to flow rearwardly into the annular turbine intake 86 and through the turbine 65. The gas, expanded through the turbine, reverses flow once more to flow forwardly through the annular duct 79 into the recuperator 74 to flow rearwardly therethrough, giving up heat to the forward flowing gas from the compressor 64. The cooled exhaust gas flows through the pre-cooler 66, giving up further waste heat, and then flows forwardly around the gear box casing and back to the compressor intake 82 to complete the full cycle. A preferred design of gas turbine would run at a working medium pressure of about four atmospheres so that the starting gas would continue to flow until this pressure had been reached, by which time the cycle would have become self-sustaining.

What I claim as my invention is:

1. A method of power generation which comprises, carrying out in a closed chamber an exothermic chemical reaction in which the fuel components react at substantially constant volume and without the production of gaseous reaction products, passing a working medium through one compartment of a two-compartment heat exchanger of which the other compartment is the closed chamber so that the working medium picks up heat conductively from the contents of the closed chamber, and expanding the heated working medium through a prime mover to generate power thus cooling the working medium.

2. A method of power generation as claimed in claim 1 in which the fuel components of the chemical reaction are a reactant and an oxidant, substantially all of the reactant consisting of at least one alkali metal from the group: (1) sodium, (2) potassium, (3) lithium, and substantially all of the oxidant consisting of at least one halogen from the group: (1) chlorine, (2) fluorine.

3. A method of power generation which comprises, carrying out in a closed chamber an exothermic chemical reaction in which the fuel components react at substantially constant volume and without the production of gaseous reaction products, passing a working medium through one compartment of a two-compartment heat exchanger of which the other compartment is the closed chamber so that the working medium picks up heat conductively from the contents of the closed chamber, expanding the heated working medium through a prime mover to generate power thus cooling the working medium, compressing the expanded working medium, and returning the compressed working medium to the heat exchanger to recommence the cycle.

4. A method of power generation as claimed in claim 3 in which the fuel components of the chemical reaction are a reactant and an oxidant, substantially all of the reactant consisting of at least one alkali metal from the group: (1) sodium, (2) potassium, (3) lithium, and substantially all of the oxidant consisting of at least one halogen from the group: (1) chlorine, (2) fluorine.

5. A method of power generation which comprises, carrying out in a closed chamber an exothermic chemical reaction which proceeds at substantially constant volume and without the production of gaseous reaction products, the chemical reaction being one of the group: (1) $4NaK_2+3ClF_3$, (2) $2NaK_2+3Cl_2$, (3) $4Li+ClF_3$, passing a working medium through one compartment of a two-compartment heat exchanger of which the other compartment is the closed chamber so that the working medium picks up heat conductively from the contents of the closed chamber, expanding the heated working medium through a prime mover to generate power thus cooling the working medium, compressing the expanded working medium, and returning the compressed working medium to the heat exchanger to recommence the cycle.

6. A method of power generation as claimed in claim 5, including the step of conductively transferring heat from the working medium before compression to the working medium after compression by means of a heat recuperator, and also including the step of conductively removing from the working medium further waste heat before compression but downstream of the said heat recuperator.

7. In a power plant process in which a compressor supplies a compressed working medium to be expanded and cooled through a rotary turbine to produce useful work, the step of conductively transferring heat to the medium upstream of the turbine by passing the working medium through one compartment of a two-compartment heat exchanger of which the other compartment is a closed chamber in which is carried out an exothermic chemical reaction which proceeds at substantially constant volume and without the production of gaseous reaction products the chemical reaction being one of the group: (1) $4NaK_2+3ClF_3$, (2) $2NaK_2+3Cl_2$, (3) $4Li+ClF_3$.

8. A gas turbine having a rotor system which includes a turbine, a compressor for supplying a working medium to the turbine, and a heating system which comprises: a closed chamber containing a first chemical, means for introducing into the closed chamber a second chemical to react exothermally with the first chemical in the closed chamber, and heat exchanger means of which the closed chamber forms a part for conductively transferring heat from the contents of the closed chamber to the working medium upstream of the turbine.

9. A gas turbine having a rotor system which includes a turbine, a compressor for supplying a gaseous working medium to the turbine, and a heating system which comprises: a closed chamber containing a reactant consisting substantially entirely of at least one alkali metal from the group: (1) sodium (2) potassium, (3) lithium, means for introducing into the closed chamber an oxidant consisting substantially entirely of at least one halogen from the group: (1) chlorine, (2) fluorine to react exothermally with the reactant in the closed chamber, and heat exchanger means of which the closed chamber forms a part for conductively transferring heat from the contents of the closed chamber to the working medium upstream of the turbine.

10. A gas turbine having a rotor system which includes a turbine, a compressor for supplying a gaseous working medium to the turbine, and a heating system comprising: a closed chamber containing an alkali metal reactant, means for introducing into the closed chamber a halogen oxidant to react exothermally with the reactant, the combination of reactant with oxidant being one from the group consisting of: (1) $NaK_2+ClF_3$, (2) $NaK_2+Cl_2$, (3) $Li+ClF_3$, and heat exchanger means of which the closed chamber forms a part for conductively transferring heat from the contents of the closed chamber to the working medium upstream of the turbine.

11. A gas turbine as claimed in claim 9 having recuperator means for heat transfer from the working medium downstream of the turbine to the working medium downstream of the compressor.

12. A gas turbine as claimed in claim 9, having shaft power take-off means from the gas turbine, the shaft power take-off means including a free turbine.

13. A gas turbine as claimed in claim 11, having precooler means immediately upstream of the compressor for the removal of waste heat from the working medium prior to entry into the compressor.

14. A gas turbine as claimed in claim 12 including a rotor rotating means for starting the gas turbine, the rotor rotating means comprising means for directing a jet of compressed gas on to the turbine blades.

References Cited by the Examiner
UNITED STATES PATENTS

| 2,471,476 | 5/1949 | Benning et al. | 60—59 X |
| 2,870,608 | 1/1959 | Comyns-Carr | 60—59 |
| 2,974,495 | 3/1961 | Pinnes et al. | 60—59 |

SAMUEL LEVINE, *Primary Examiner.*